(12) United States Patent
Han et al.

(10) Patent No.: US 8,964,579 B2
(45) Date of Patent: Feb. 24, 2015

(54) METHOD FOR POSITIONING USER EQUIPMENT IN A WIRELESS MOBILE COMMUNICATION SYSTEM, AND APPARATUS FOR PERFORMING THE METHOD

(75) Inventors: Seung Hee Han, Anyang-si (KR); Jae Hoon Chung, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 83 days.

(21) Appl. No.: 13/318,773

(22) PCT Filed: Apr. 30, 2010

(86) PCT No.: PCT/KR2010/002764
§ 371 (c)(1),
(2), (4) Date: Nov. 3, 2011

(87) PCT Pub. No.: WO2010/128774
PCT Pub. Date: Nov. 11, 2010

(65) Prior Publication Data
US 2012/0057498 A1    Mar. 8, 2012

Related U.S. Application Data

(60) Provisional application No. 61/175,769, filed on May 5, 2009.

(30) Foreign Application Priority Data

Feb. 2, 2010   (KR) .......................... 10-2010-0009452

(51) Int. Cl.
*H04W 24/10* (2009.01)
*G01S 5/00* (2006.01)
*G01S 5/10* (2006.01)

(52) U.S. Cl.
CPC ....... *G01S 5/0036* (2013.01); *G01S 5/10* (2013.01)
USPC ....................................... 370/252

(58) Field of Classification Search
CPC ....... G01S 5/10; G01S 5/0036; G01S 5/0205; G01S 5/0221; G01S 1/04; G01S 1/20; H04L 27/2695; H04L 27/2663; H04L 27/2672; H04L 27/2675
USPC .......... 370/328–333; 455/411, 423, 428, 455
See application file for complete search history.

(56) References Cited

U.S. PATENT DOCUMENTS

| 5,600,706 | A | | 2/1997 | Dunn et al. | |
|---|---|---|---|---|---|
| 5,898,665 | A | * | 4/1999 | Sawahashi et al. | ........... 370/342 |

(Continued)

FOREIGN PATENT DOCUMENTS

| CN | 1276956 | 12/2000 |
|---|---|---|
| JP | 2003315433 | 11/2003 |

(Continued)

OTHER PUBLICATIONS

3rd Generation Partnership Project, "Technical Specification Group Radio Access Network; Physical layer; Measurements (TDD) (Release 8)", 3GPP TS 25.225, V8.2.0, Mar. 2009, 29 pages.
European Patent Office Application Serial No. 10772234.0, Search Report dated Dec. 11, 2014, 7 pages.

*Primary Examiner* — Jae Y Lee
*Assistant Examiner* — Jean F Voltaire
(74) *Attorney, Agent, or Firm* — Lee, Hong, Degerman, Kang & Waimey

(57) ABSTRACT

The present invention relates to a wireless communication system, and more particularly, to an apparatus for positioning a user equipment and method thereof. The present invention includes receiving, from a plurality of base stations including a serving cell, a predetermined number of consecutive positioning subframes in a radio frame at a predetermined period, each of the consecutive positioning subframe including a reference signal, measuring a time of arrival of the positioning subframes by using the reference signal, and transmitting a result of the measured time of arrival of the positioning subframe to the serving cell, wherein the predetermined period is set to be larger than a generation period of the reference signal and wherein sequences of the reference signals included in the consecutive positioning subframes are different from each other.

10 Claims, 14 Drawing Sheets

(56) References Cited

U.S. PATENT DOCUMENTS

| | | |
|---|---|---|
| 2004/0147266 A1* | 7/2004 | Hwang et al. ............ 455/445 |
| 2009/0135803 A1* | 5/2009 | Luo et al. ............ 370/350 |
| 2010/0061302 A1* | 3/2010 | Ishii et al. ............ 370/328 |
| 2010/0195566 A1* | 8/2010 | Krishnamurthy et al. .... 370/328 |
| 2010/0273506 A1* | 10/2010 | Stern-Berkowitz et al. ......... 455/456.1 |
| 2011/0317613 A1* | 12/2011 | Gerstenberger et al. ...... 370/312 |

FOREIGN PATENT DOCUMENTS

| | | |
|---|---|---|
| JP | 2009515201 | 4/2009 |
| KR | 10-2003-0018280 | 3/2003 |
| KR | 10-0766558 | 10/2007 |
| WO | 02/075349 | 9/2002 |
| WO | 2008084622 | 7/2008 |
| WO | 2008114181 | 9/2008 |
| WO | 2008/130051 | 10/2008 |

* cited by examiner

Antenna port 5

Antenna port 5

METHOD FOR POSITIONING USER EQUIPMENT IN A WIRELESS MOBILE COMMUNICATION SYSTEM, AND APPARATUS FOR PERFORMING THE METHOD

CROSS-REFERENCE TO RELATED APPLICATIONS

This application is the National Stage filing under 35 U.S.C. 371 of International Application No. PCT/KR2010/002764, filed on Apr. 30, 2010, which claims the benefit of earlier filing date and right of priority to Korean Application Serial No. 10-2010-0009452, filed on Feb. 2, 2010, and also claims the benefit of U.S. Provisional Application Ser. No. 61/175,769, filed on May 5, 2009, the contents of all of which are incorporated by reference herein in their entirety.

BACKGROUND OF THE INVENTION

1. Field of the Invention

The present invention relates to a wireless communication system, and more particularly, to an apparatus for positioning a user equipment and method thereof.

2. Discussion of the Related Art

Physical Structure of LTE

Generally, 3GPP LTE ($3^{rd}$ generation project partnership long term evolution) supports a type-1 radio frame structure applicable to FDD (frequency division duplex) and a type-2 radio frame structure applicable to TDD (time division duplex).

FIG. 1 shows a structure of a type-1 radio frame.

Referring to FIG. 1, a type-1 radio frame consists of 10 subframes. Each of the frames consists of 2 slots.

FIG. 2 shows a structure of a type-2 radio frame.

Referring to FIG. 2, a type-2 radio frame consists of 2 half frames. Each of the half frames consists of 5 subframes, a DwPTS (downlink pilot time slot), a guard period (GP), and an UpPTS (uplink pilot time slot). And, each of the subframes consists of 2 slots. The DwPTS is used for initial cell search, synchronization or channel estimation in a user equipment. The UpPTS is used for channel estimation and in matching uplink transmission synchronization of a user equipment. The guard period is a period for eliminating interference generated from uplink due to a multi-path delay of a downlink signal between uplink and downlink. In particular, irrespective of a type of radio frame, 1 subframe consists of 2 slots.

FIG. 3 shows a structure of an LTE downlink slot.

Referring to FIG. 3, a signal transmitted in each slot can be represented as a resource grid consisting of $N_{RB}^{DL} N_{sc}^{RB}$ subcarriers and $N_{symb}^{DL}$ OFDM (orthogonal frequency division multiplexing) symbols. In this case, the $N_{RB}^{DL}$ indicates the number of resource blocks (RBs) in downlink (DL), the $N_{sc}^{RB}$ indicates the number of subcarriers constructing 1 RB, and the $N_{symb}^{DL}$ indicates the number of OFDM symbols in one downlink slot.

FIG. 4 shows a structure of an LTE uplink slot.

Referring to FIG. 4, a signal transmitted in each slot can be represented as a resource grid consisting of $N_{RB}^{UL} N_{sc}^{RB}$ subcarriers and $N_{symb}^{UL}$ OFDM (orthogonal frequency division multiplexing) symbols. In this case, the $N_{RB}^{UL}$ indicates the number of resource blocks (RBs) in uplink (UL), the $N_{sc}^{RB}$ indicates the number of subcarriers constructing 1 RB, and the $N_{symb}^{UL}$ indicates the number of OFDM symbols in one uplink slot.

Resource element (RE) is a resource unit defined as indexes a and b within the UL/DL slot and indicates 1 subcarrier and 1 OFDM symbol. In this case, 'a' indicates an index on a frequency axis and 'b' indicates an index on a time axis.

FIG. 5 is a diagram for a structure of a DL subframe.

Referring to FIG. 5, maximum 3 OFDM symbols located in front part of a first slot within one subframe correspond to a control region allocated to a control channel. The rest of OFDM symbols correspond to a data region allocated to a physical downlink shared channel (PDSCH). For example, downlink control channels used by 3GPP LTE include PCFICH (Physical Control Format Indicator Channel), PDCCH (Physical Downlink Control Channel), PHICH (Physical Hybrid ARQ Indicator Channel) and the like.

Definition of MIMO

First of all, MIMO is an abbreviation of multiple-input multiple-output and indicates a scheme of raising data transceiving efficiency by adopting multiple transmitting antennas and multiple receiving antennas instead of using a single transmitting antenna and a single receiving antenna conventionally. In particular, MIMO is the technology of increasing capacity or enhancing performance using the multiple antennas in a transmitter or receiver of a wireless communication system. In the following description, the MIMO shall be named a multi-antenna.

The multi-antenna technology applies a technique of completing a message by gathering data fragments received via several antennas together instead of depending on a single antenna path to receive the message. Since the multi-antenna technology enhances a data rate within a specific range or extends a system range for a specific data rate, it is the next generation mobile communication technology that is widely applicable to a mobile communication terminal, a relay and the like. Many attentions are paid to the multi-antenna technology as a next generation technology to overcome a throughput limit of mobile communication on the verge of a critical situation due to expansion of data communication and the like.

FIG. 6 is a diagram for a configuration of a multi-antenna (MIMO) communication system.

Referring to FIG. 6, if the number of transmitting antennas and the number of receiving antennas are simultaneously incremented into $N_T$ and $N_R$, respectively, channel transmission capacity theoretically increases in proportion to the number of antennas unlike the case of using a plurality of antennas in a transmitter or receiver only. Hence, a transmission rate is raised and frequency efficiency can be dramatically enhanced. The transmission rate according to the increase of channel transmission capacity can be theoretically raised by an amount resulting from multiplying a maximum transmission rate $R_0$ in case of using a single antenna by an increase rate $R_i$ shown in Formula 1.

$$R_i = \min(N_T, N_R) \quad \text{[Formula 1]}$$

For instance, in an MIMO communication system using 4 transmitting antennas and 4 receiving antennas, it is able to theoretically obtain a transmission rate 4 times greater than that of a single antenna system. Since this theoretical capacity increase of the multi-antenna system has been proved in the middle of 90's, many efforts are ongoing to be made to research and develop various technologies to provide substantial data transmission rate improvement. And, some of the technologies have been already reflected on the standards of the various wireless communications such as $3^{rd}$ generation mobile communications, next generation wireless LAN and the like.

Regarding the multi-antenna relevant study trends, many efforts in various aspects are ongoing to be made to research and develop information theory related to multi-antenna communication capacity calculations and the like in various channel configurations and multiple access environments, radio channel measurement and modeling of multi-antenna systems, spatiotemporal signal processing for enhancements of transmission reliability and transmission rate, etc.

Channel Estimation

In a wireless communication system environment, fading occurs due to a multi-path time delay. A process for reconstructing a transmission signal by compensating signal distortion generated from abrupt environment change attributed to the fading is called channel estimation. In general, the channel estimation is performed using a signal known to both a transmitting side and a receiving side. In this case, the signal known to both of the transmitting side and the receiving side is called a pilot signal or a reference signal (hereinafter abbreviated RS).

In a wireless communication system using orthogonal frequency division transmission scheme, reference signals are classified into a type of allocating reference signals to all subcarriers and a type of allocating reference signals between data subcarriers.

In order to obtain a gain of channel estimation performance, a symbol including only reference signals such as a preamble signal is used. If a preamble signal is used, since density of reference signals is high, channel estimation performance can be improved better than that of the type of allocating reference signals between data subcarriers. Yet, since a transmission amount of data is reduced, the type of allocating the reference signals between the data subcarriers is used to increase the transmission amount of the data. If this type is used, the reference signal density is lowered. Therefore, the channel estimation performance is degraded. And, the demand for minimizing the degradation of the channel estimation performance is rising.

A receiver performs channel estimation using a reference signal in the following manner. First of all, since a receiver is aware of information of a reference signal, channel information between the receiver and a transmitter is estimated from a received signal. The receiver is able to correctly demodulate data transmitted by the transmitter using the estimated channel information value.

If a reference signal transmitted by a transmitter, channel information experienced by the reference signal in the course of transmission, a heat noise generated from a receiver, and a signal received by the receiver are set to p, h, n and y, respectively, the received signal y can be represented as 'y=h·p+n'. In this case, since the receiver is already aware of the reference signal p, it is able to estimate channel information $\hat{h}$ according to Formula 2.

$$\hat{h} = y/p = h + n/p = h + \hat{n}$$ [Formula 2]

In Formula 2, accuracy of a channel estimation value $\hat{h}$ estimated using the reference signal p depends on a value $\hat{n}$. In order to estimate an accurate value $\hat{h}$, the $\hat{n}$ should converge into 0. Hence, a channel should be estimated using a number of reference signals. If the channel is estimated using a number of reference signals, influence of the $\hat{n}$ can be minimized.

UE-Specific Reference Signal Allocation Scheme in 3GPP LTE Downlink System

A structure of a radio frame applicable to FDD among the above described radio frame structures supported by 3GPP LTE is explained in detail as follows. First of all, 1 frame is transmitted in 10 msec. This frame consists of 10 subframes. And, one subframe is transmitted in 1 msec.

One subframe consists of 14 or 12 OFDM (orthogonal frequency division multiplexing) symbols. And, the number of subcarriers in one OFDM symbol is set to one of 128, 26, 512, 1024, 1536 and 2048 to use.

FIG. 7 is a diagram of a structure of a UE-specific (user equipment-specific) DL reference signal in a subframe when 1 TTI (transmission time interval) uses a normal cyclic prefix (CP) having 14 OFDM symbols.

Referring to FIG. 7, 'R5' indicates a UE-specific reference signal and 'l' indicates a position of an OFDM symbol in a subframe.

FIG. 8 is a diagram of a structure of a UE-specific DL reference signal in a subframe when 1 TTI (transmission time interval) uses an extended cyclic prefix (CP) having 12 OFDM symbols.

FIGS. 9 to 11 are diagrams of structures of UE-common DL reference signals for systems having 1, 2 and 4 transmitting antennas, respectively, when 1 TTI has 14 OFDM symbols.

Referring to FIGS. 9 to 11, R0 indicates a pilot symbol for a transmitting antenna 0, R1 indicates a pilot symbol for a transmitting antenna 1, R2 indicates a pilot symbol for a transmitting antenna 2, and R3 indicates a pilot symbol for a transmitting antenna 3. And, in order for eliminating interference with the rest of the transmitting antennas except the transmitting antenna, via which a pilot symbol is not transmitted, a signal is not carried on a subcarrier for which the pilot symbol of each of the transmitting antennas is used.

FIG. 7 and FIG. 8 show the structures of the UE-specific DL reference signals, each of which can be simultaneously used together with the UE-common DL reference signal shown in FIGS. 9 to 11. For instance, the UE-common DL reference signals shown in FIGS. 9 to 11 are used for the OFDM symbols 0 to 2 of a first slot in which control information is transmitted. And, the UE-specific DL reference signal is usable for the rest of the OFDM symbols.

Moreover, it is able to enhance channel estimation performance by reducing interference of pilot symbol received by a receiver from a neighbor cell in a manner that a DL reference signal per cell is transmitted by being multiplied by a predefined sequence (e.g., pseudo-random (PN) sequence, m-sequence, etc.). The PN sequence is applied by an OFDM symbol unit within one subframe. And, the PN sequence is differently applicable according to a cell ID, a subframe index, an OFDM symbol position and a user equipment ID.

For example, in case of the structure of 1Tx pilot symbol shown in FIG. 9, it can be observed that 2 pilot symbols of one transmitting antenna are used for a specific OFDM symbol including a pilot symbol. In case of the 3GPP LTE systems, there is a system including bandwidths of various types. In this case, the types include 6 RBs (resource blocks) to 110 RBs. Hence, the number of pilot symbols of one transmitting antenna in one OFDM symbol including a pilot symbol is $2 \times N_{RB}$. And, a sequence used by being multiplied by a downlink reference signal per cell should have a length of $2 \times N_{RB}$. In this case, the $N_{RB}$ indicates the number of RBs according to a bandwidth. And, a binary sequence or a complex sequence may be used as a sequence. In Formula 3, r(m) represents one example for a complex sequence.

$$r(m) = \frac{1}{\sqrt{2}}(1 - 2 \cdot c(2m)) + j\frac{1}{\sqrt{2}}(1 - 2 \cdot c(2m + 1)),$$ [Formula 3]

$$m = 0, 1, \ldots, 2N_{RB}^{max} - 1$$

In Formula 3, $N_{RB}^{max}$ is the number of RBs corresponding to a maximum bandwidth and can be set to 110 according to the above description. Moreover, 'c' indicates a PN sequence and can be defined as a Gold sequence of length-31. In case of a UE-specific DL reference signal, Formula 3 can be represented as Formula 4.

$$r(m) = \frac{1}{\sqrt{2}}(1-2\cdot c(2m)) + j\frac{1}{\sqrt{2}}(1-2\cdot c(2m+1)), \quad \text{[Formula 4]}$$

$$m = 0, 1, \ldots, 2N_{RB}^{PDSCH} - 1$$

In Formula 4, $N_{RB}^{PDSCH}$ indicates the number of RBs corresponding to DL data allocated to a specific user equipment. Therefore, a length of sequence can vary according to an amount allocated to a user equipment.

The above described structure of the UE-specific DL reference signal can be transmitted as 1 data stream only. Since it is impossible to simply extend the structure, it is unable to transmit a plurality of streams. Therefore, the structure of the UE-specific DL reference signal needs to be extended to transmit a plurality of data streams.

User Equipment Positioning Method

The necessity of user equipment positioning is ongoing to raise according to various operations due to diverse application in real life environments. The user equipment positioning can be mainly classified into a GPS (global positioning system) based method and a terrestrial positioning based method.

The GPS based method measures a location of a user equipment using satellites. The GPS based method needs signals from at least 4 satellites. And, it is disadvantageous in that the GPS based method is not available for an indoor environment.

The terrestrial positioning based method measures a location of a user equipment using a timing difference between signals from base stations. The terrestrial positioning based method needs signals received from at least 3 base stations. The terrestrial positioning based method has positioning estimation performance poorer than that of the GPS based method but is available for almost every environment. The terrestrial positioning based method estimates a location of a user equipment using a synchronization signal or a reference signal generally. The terrestrial positioning based method is defined as the following terminology per standard.

In UTRAN (UMTS Terrestrial Radio Access Network), the terrestrial positioning based method is defined as OTDOA (Observed Time Difference of Arrival). In GERAN (GSM/EDGE Radio Access Network), the terrestrial positioning based method is defined as E-OTD (Enhanced Observed Time Difference). In CDMA2000, the terrestrial positioning based method is defined as AFLT (Advanced Forward Link Trilateration).

FIG. 12 is a diagram of an example for downlink OTDOA as a sort of a terrestrial positioning based method used by the 3GPP standard.

Referring to FIG. 12, since a current user equipment uses a reference clock with reference to a subframe transmitted by a current serving cell, signals received from neighbor cells are received with OTDOAs different from each other.

FIG. 13 is a diagram of an example for a user equipment positioning method using OTDOA.

Referring to FIG. 13, a location of a user equipment can be calculated by solving a linear equation using Taylor series expansion (cf. Y. Chan and K. Ho, "A simple and efficient estimator for hyperbolic location," IEEE Trans. Signal Processing, vol. 42, pp. 1905-1915, August 1994).

The above mentioned user equipment positioning method can be normally performed via Common Reference Signal (CRS) or Primary Synchronization Signal/Secondary Synchronization Signal (PSS/SSS). Alternatively, the user equipment positioning method can be performed in a manner of defining Positioning Reference Signal (PRS) dedicated to LCS (LoCation Service).

By defining a positioning subframe for LCS, data scheduling is not performed on a corresponding positioning subframe and a reference signal is transmitted only. The positioning subframe can be defined through scheduling in normal subframe or by configuring MBSFN subframe (e.g., periodicity of 80 ms or 320 ms). Es/It is increased by extending inter-cell reuse through the above method, whereby measurement of a neighbor cell is enabled. In this case, the 'Es' indicates signal energy of a specific signal. The 'It' indicates power spectral density of an interference signal and is generally called SINR.

The LCS requirements regulated by Federal Communications Commission (FCC) E911 (Enhanced 911) are shown in Table 1 (cf. FCC 99-245, "Revision of the Commission's Rules to Ensure Compatibility with Enhanced 911 Emergency Calling Systems").

TABLE 1

| Solutions | 67% of Calls | 95% of Calls |
|---|---|---|
| Handset-Based | 50 meters | 150 meters |
| Network-Based | 100 meters | 300 meters |

Yet, in order to meet the above requirements according to a cell deployment scenario, multiple subframe averaging should be performed. To acquire a gain of the multiple subframe averaging, periodicity of a positioning subframe needs to be appropriately set. For instance, if a periodicity of a reference signal (RS) sequence is defined as 10 ms and a periodicity of a positioning subframe is 80 ms, effect of interference averaging does not exist.

Therefore, it is necessary to set a periodicity of a reference signal (RS) sequence and a periodicity of a positioning subframe to obtain interference averaging effect.

SUMMARY OF THE INVENTION

Accordingly, the present invention is directed to an apparatus for positioning a user equipment and method thereof that substantially obviate one or more problems due to limitations and disadvantages of the related art.

An object of the present invention is to provide an apparatus for positioning a user equipment and method thereof, by which interference averaging effect can be obtained in a manner of setting a generation periodicity of a reference signal and a periodicity of a positioning subframe.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of positioning a user equipment in a wireless communication system according to the present invention includes the steps of receiving a user equipment positioning subframe including a reference signal by a prescribed periodicity from a base station and measuring a TOA (timing of arrival) of the subframe using the reference signal included in the received subframe, wherein the prescribed periodicity is set in a manner that a sequence of the reference signal included in the user equipment positioning subframe is changed per the prescribed periodicity.

Preferably, the prescribed periodicity can be set disjoint with a generation periodicity of a sequence of the reference signal.

Preferably, the prescribed periodicity can be set smaller than a generation periodicity of a sequence of the reference signal.

Preferably, the prescribed periodicity can be set to a value greater than a generation periodicity of a sequence of the reference signal and smaller than a twice of the generation periodicity of the reference signal.

Preferably, the reference signal can include a common reference signal or a positioning reference signal.

Preferably, the method further includes the step of receiving information on the prescribed periodicity via RRC (radio resource control).

In another aspect of the present invention, a user equipment in a wireless communication system includes a receiving unit configured to receive a user equipment positioning subframe including a reference signal by a prescribed periodicity from a base station and a processing unit electrically connected to the receiving unit, the processing unit configured to position a location of the user equipment using the reference signal included in the received user equipment positioning subframe, wherein the prescribed periodicity is set in a manner that a sequence of the reference signal included in the user equipment positioning subframe is changed per the prescribed periodicity.

Preferably, the prescribed periodicity can be set disjoint with a generation periodicity of a sequence of the reference signal.

Preferably, the prescribed periodicity can be set smaller than a generation periodicity of a sequence of the reference signal.

Preferably, the prescribed periodicity can be set to a value greater than a generation periodicity of a sequence of the reference signal and smaller than a twice of the generation periodicity of the reference signal.

Preferably, the reference signal can include a common reference signal or a positioning reference signal.

Preferably, the receiving unit can receive information on the prescribed periodicity.

More preferably, the receiving unit can receive information on the prescribed periodicity via RRC (radio resource control).

In another aspect of the present invention, a method for positioning a user equipment in wireless communication system includes receiving, from a plurality of base stations including a serving cell, a predetermined number of consecutive positioning subframes in a radio frame at a predetermined period, each of the consecutive positioning subframes including a reference signal, measuring a time of arrival of the positioning subframes by using the reference signal, and transmitting a result of the measured time of arrival of the positioning subframe to the serving cell, wherein the predetermined period is set to be larger than a generation period of the reference signal and wherein a sequence of the reference signal included in each of the consecutive positioning subframes is different from each other.

Preferably, the reference signal is one of a common reference signal and a positioning reference signal.

Preferably, the method further includes receiving information on the predetermined period via Radio Resource Control (RRC).

Preferably, the predetermined number of the consecutive positioning subframes is one of 2, 3 and 4.

In a further aspect of the present invention, a user equipment in a wireless communication system includes a receiving unit for receiving, from a plurality of base stations including a serving cell, a predetermined number of consecutive positioning subframes in a radio frame at a predetermined period, each of the consecutive positioning subframes including reference signal, a processing unit for measuring a time of arrival of the positioning subframes by using the reference signal, and a transmitting unit for transmitting a result of the measured time of arrival of the positioning subframe to the serving cell, wherein the predetermined period is set to be larger than a generation period of the reference signal and wherein a sequence of the reference signal included in each of the consecutive positioning subframes is different from each other.

Preferably, the reference signal is one of a common reference signal and positioning reference signal.

Preferably, the receiving unit receives information on the predetermined period via Radio Resource Control (RRC).

More preferably, the predetermined number of the consecutive positioning subframes is one of 2, 3 and 4.

According to embodiments of the present invention, since a sequence of a reference signal transmitted in a positioning subframe varies each periodicity, an interference diversity gain can be obtained.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
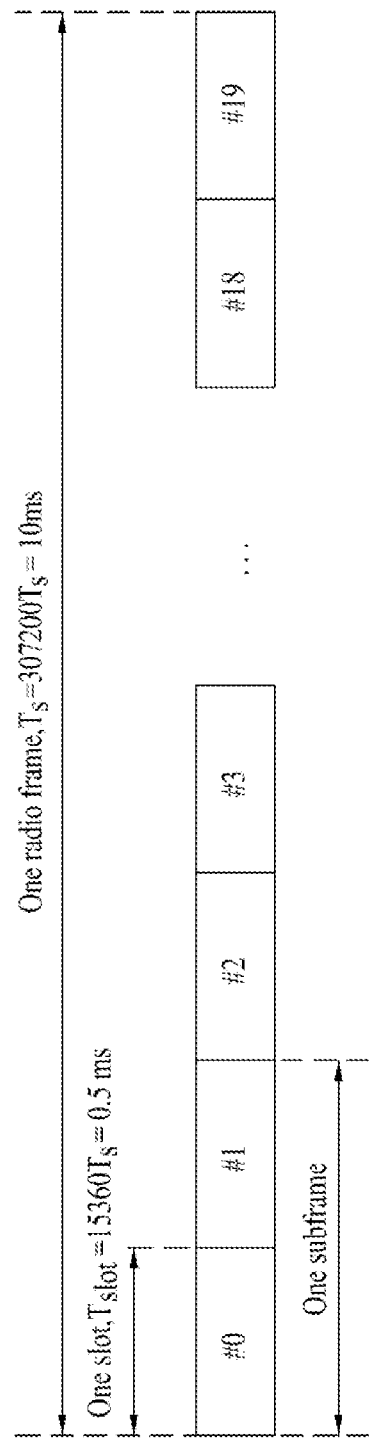
FIG. 1 shows a structure of a type-1 radio frame.
Figure 2:
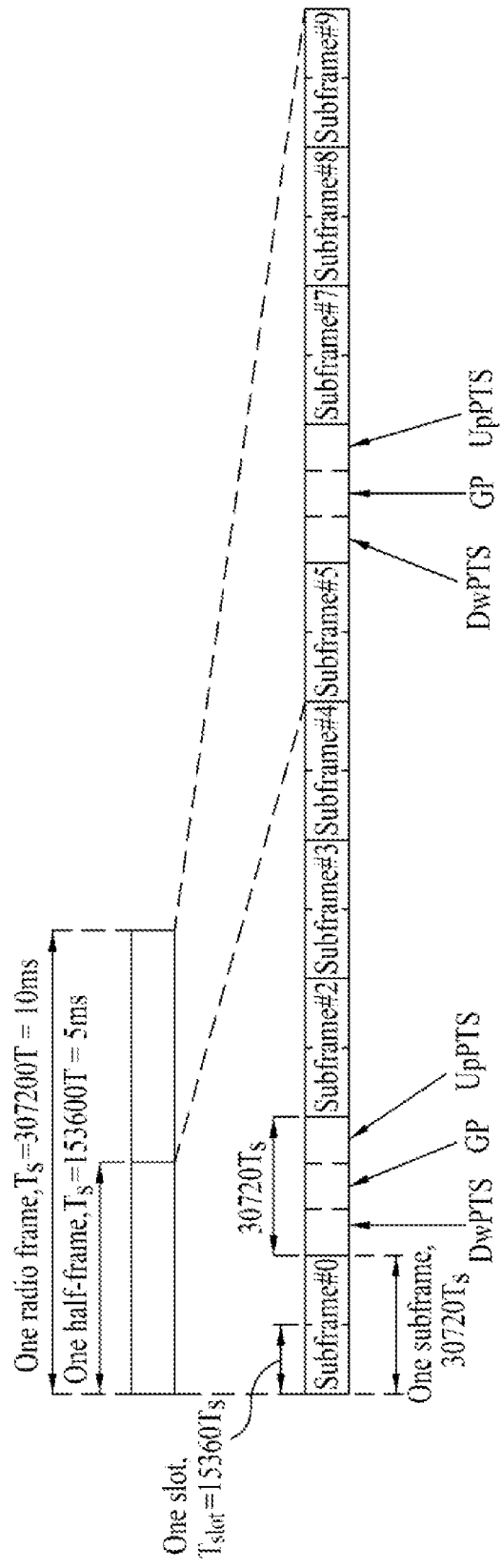
FIG. 2 shows a structure of a type-2 radio frame.
Figure 3:
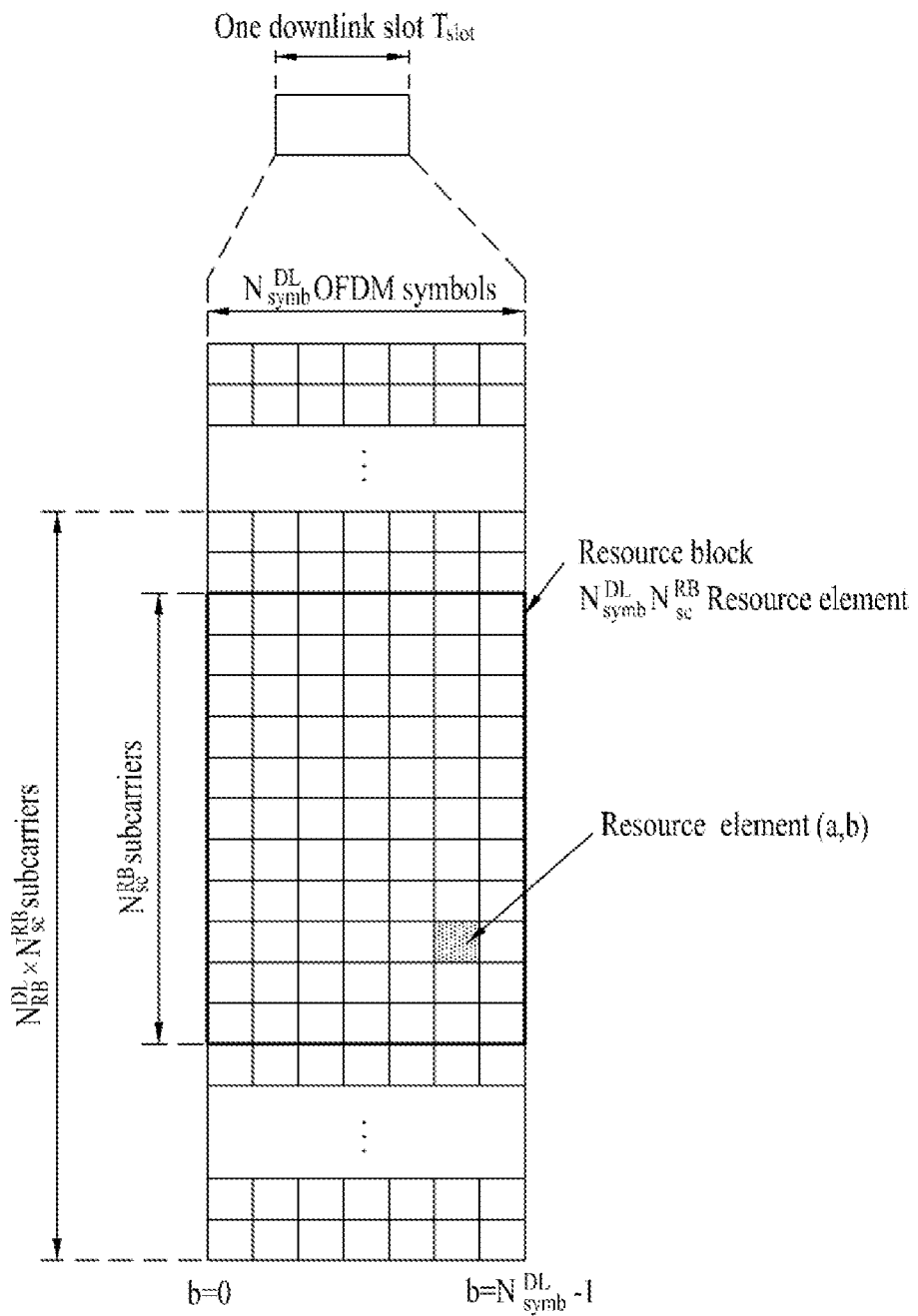
FIG. 3 shows a structure of an LTE downlink slot.
Figure 4:
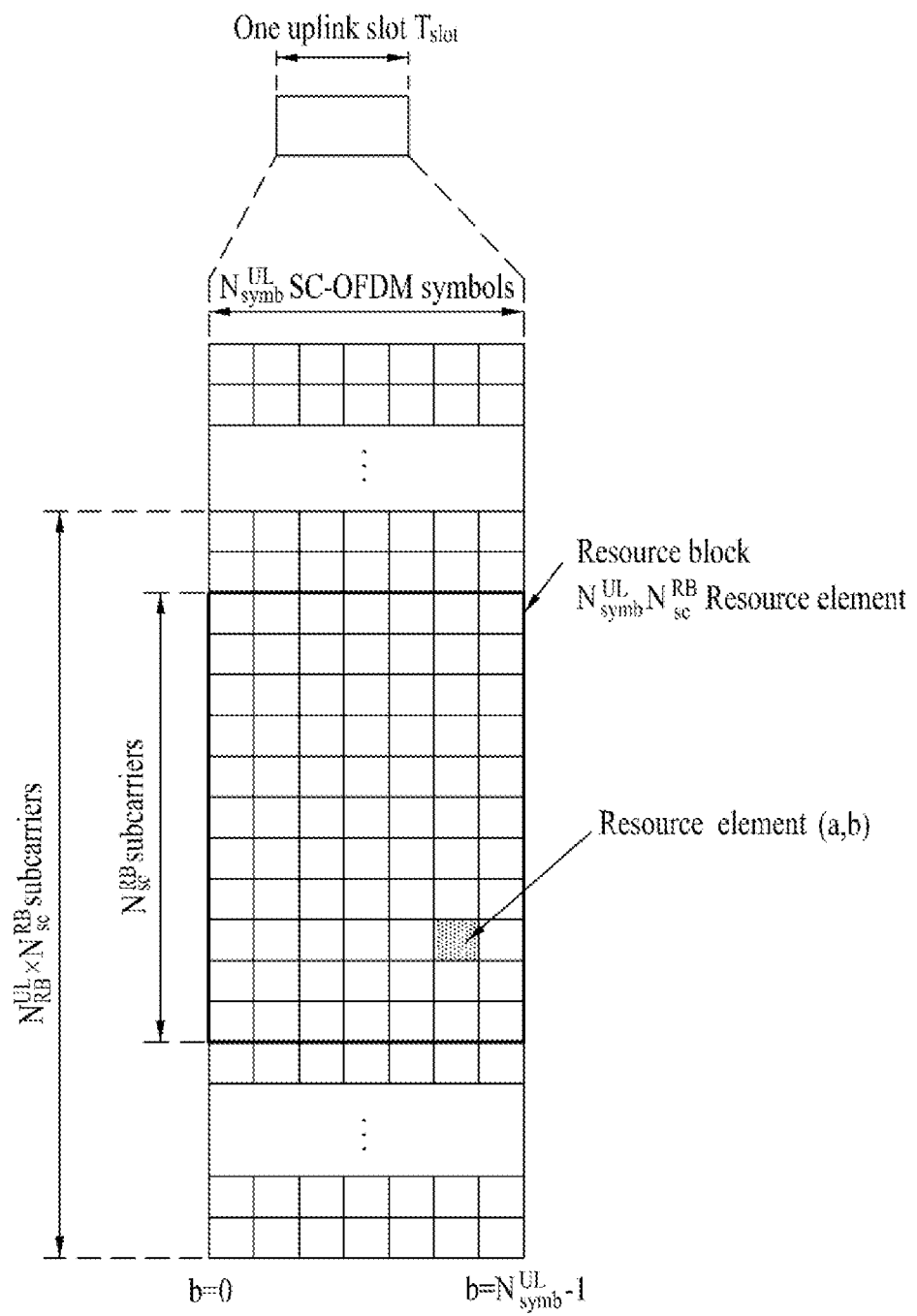
FIG. 4 shows a structure of an LTE uplink slot.
Figure 5:
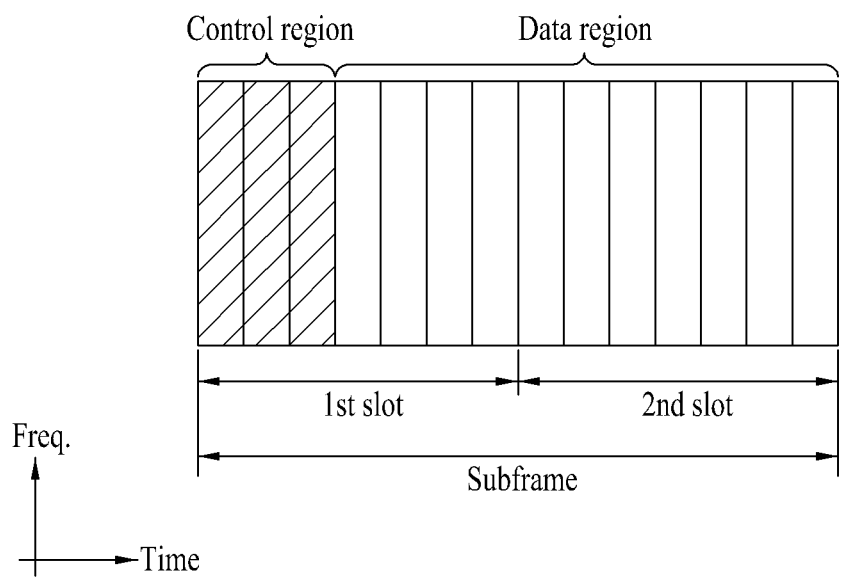
FIG. 5 is a diagram for a structure of a DL subframe.
Figure 6:
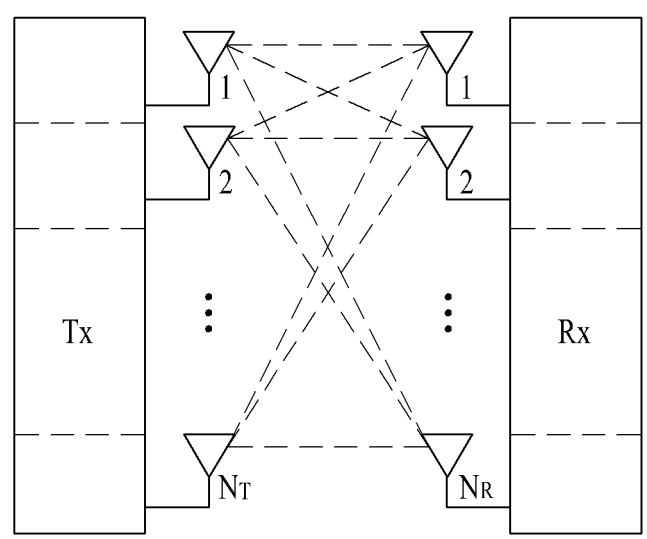
FIG. 6 is a diagram for a configuration of a multi-antenna (MIMO) communication system.
Figure 7:
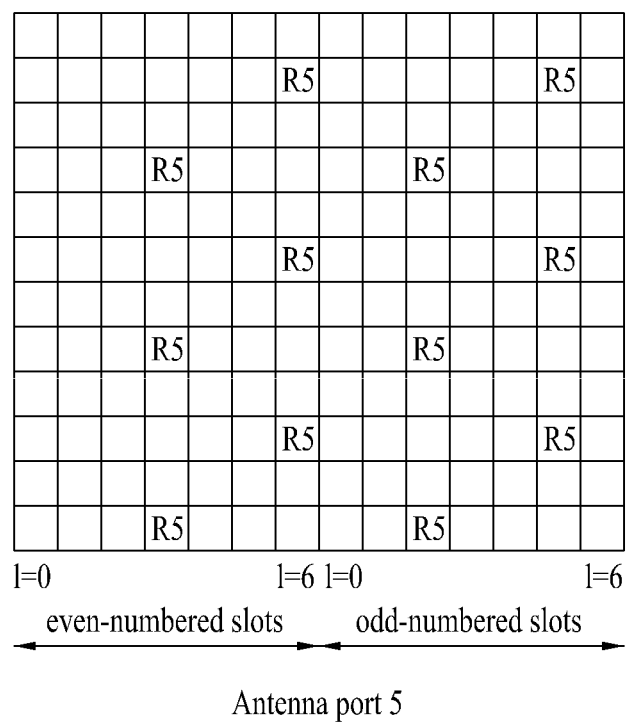
FIG. 7 is a diagram of a structure of a UE-specific DL reference signal in a subframe when 1 TTI (transmission time interval) uses a normal cyclic prefix (CP) having 14 OFDM symbols.
Figure 8:
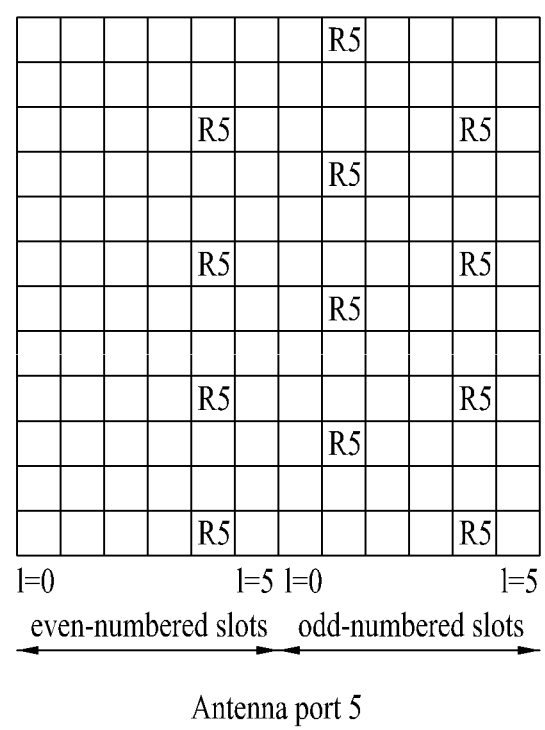
FIG. 8 is a diagram of a structure of a UE-specific DL reference signal in a subframe when 1 TTI (transmission time interval) uses an extended cyclic prefix (CP) having 12 OFDM symbols.
Figure 9:
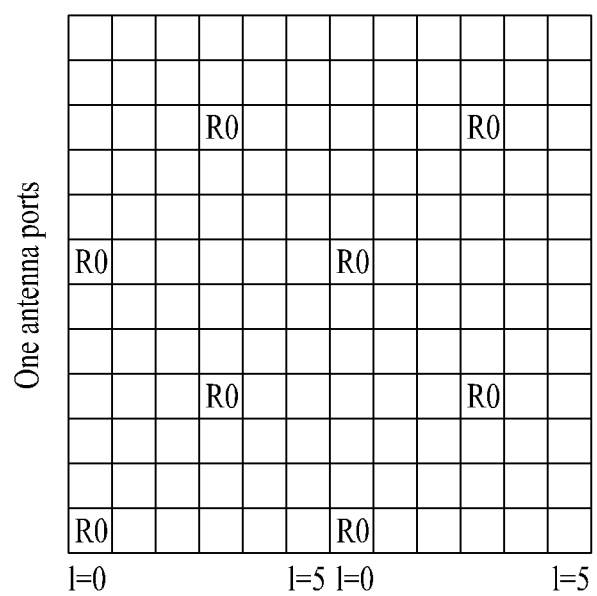
FIGS. 9 to 11 are diagrams of structures of UE-common DL reference signals for systems having 1, 2 and 4 transmitting antennas, respectively, when 1 TTI has 14 OFDM symbols.
Figure 10:
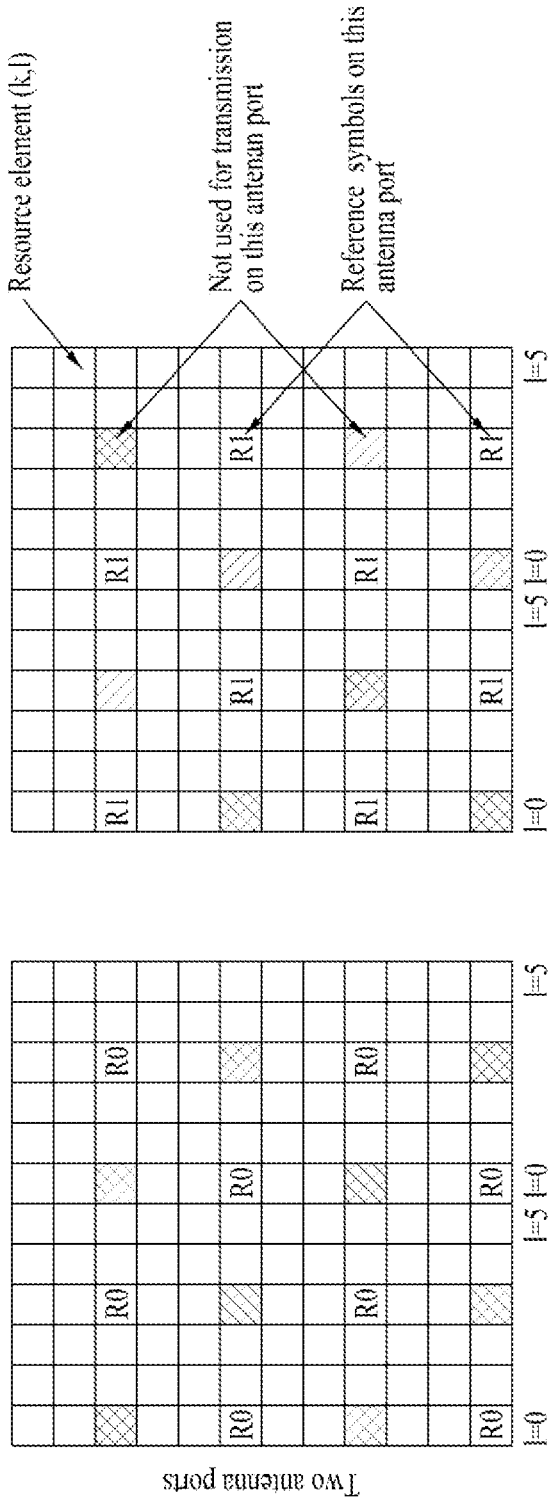
Figure 11:
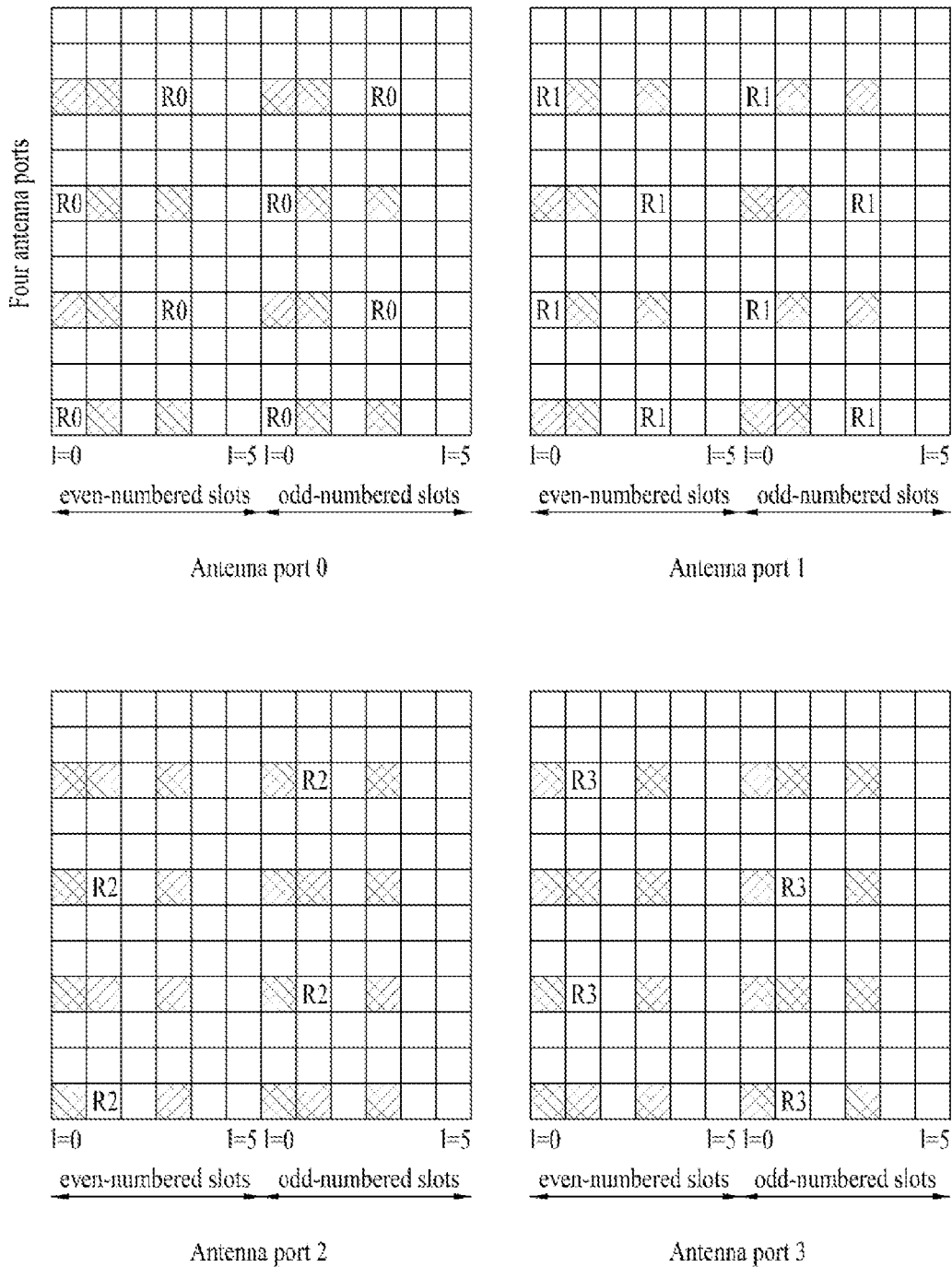
Figure 12:
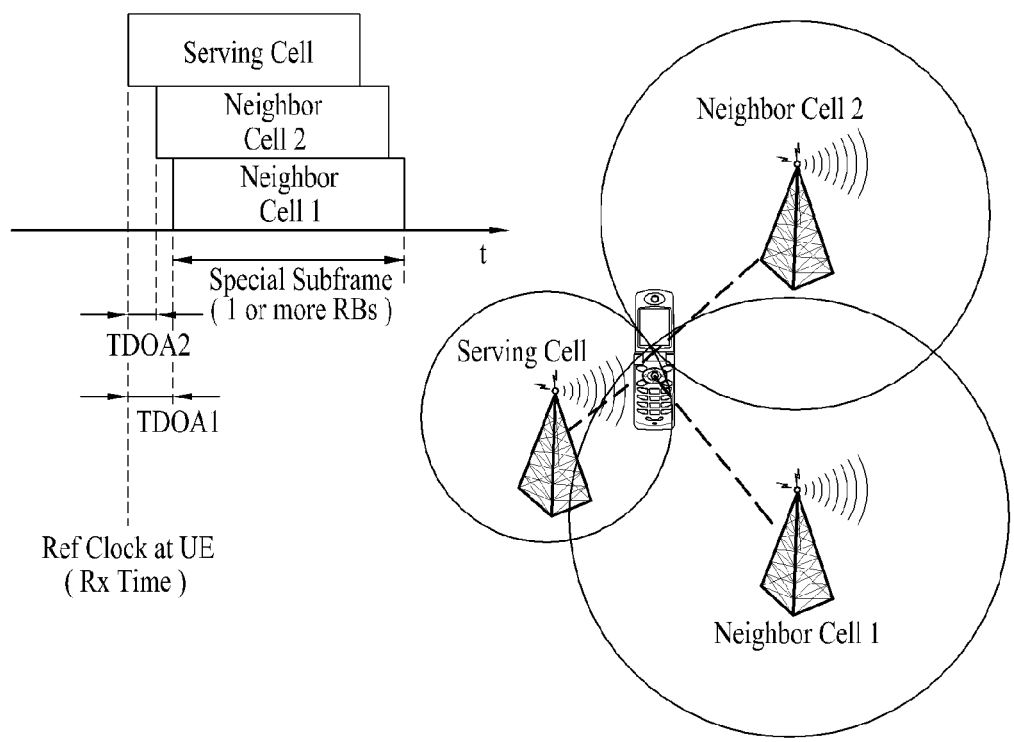
FIG. 12 is a diagram of an example for downlink OTDOA as a sort of a terrestrial positioning based method used by the 3GPP standard.
Figure 13:
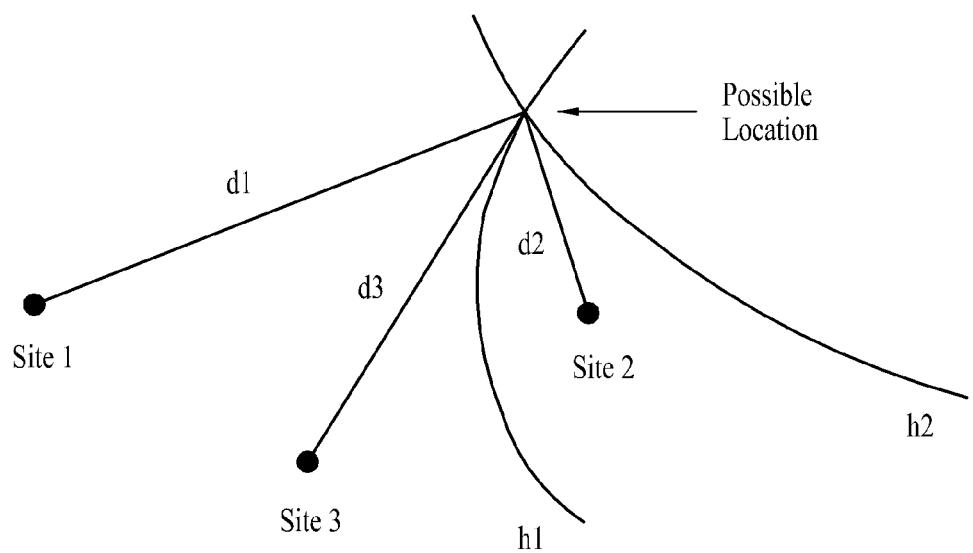
FIG. 13 is a diagram of an example for a user equipment positioning method using OTDOA.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made centering on predetermined terminologies, they need not to be limited to the terminologies. If the following descriptions are made using random terminologies, the same meanings can be provided. Wherever possible, the same reference numbers will be used throughout the drawings to refer to the same or like parts.

Throughout this disclosure, if a prescribed part 'includes' a prescribed element, it means that another element can be further included instead of eliminating other elements as long as absence of special objection. Moreover, such a terminology as '~part' '~functionality', '~module' and the like means a unit for handling at least one function or operation, which can be implemented by software, hardware or combination thereof.

According to the present invention, it is assumed as using a terrestrial positioning based method as a user equipment positioning method. This method can be normally performed via Common Reference Signal (CRS) or Primary Synchronization Signal/Secondary Synchronization Signal (PSS/SSS). Alternatively, this method can define to use a Positioning Reference Signal (PRS) dedicated to LCS (LoCation Service).

By defining a positioning subframe for LCS, data scheduling is not performed on a corresponding positioning subframe and a reference signal can be transmitted only.

A reference signal sequence $r_{l,n_s}(m)$ for positioning can be defined as Formula 5.

$$r_{l,n}(m) = \frac{1}{\sqrt{2}}(1 - 2 \cdot c(2m)) + j\frac{1}{\sqrt{2}}(1 - 2 \cdot c(2m+1)),$$ [Formula 5]

$$m = 0, 1, \ldots, 2N_{RB}^{max,DL} - 1$$

In Formula 5, $n_s$ indicates a slot number within one radio frame and l indicates an OFDM symbol number within a corresponding slot. Moreover, c(i) indicates a pseudo-random sequence. And, a pseudo-random sequence generator is defined at a start of each OFDM symbol by Formula 6.

$$c_{init} = 2^{10} \cdot (7 \cdot (n_s + 1) + l + 1) \cdot (2 \cdot N_{ID}^{cell} + 1) + 2 \cdot N_{ID}^{cell} + N_{CP}$$ [Formula 2]

In Formula 6, $N_{CP}$ meets Formula 7.

$$N_{CP} = \begin{cases} 1 & \text{for normal } CP \\ 0 & \text{for extended } CP \end{cases}$$ [Formula 7]

Based on the above contents, interference averaging is explained for the description of the present invention as follows.

First of all, assume that a periodicity of a reference signal sequence is 10 ms. And, assume that a periodicity of a positioning subframe is 80 ms. The same reference signal sequence is repeated each periodicity of the reference signal sequence. And, a positioning subframe used in determining a location of a user equipment is transmitted each positioning subframe periodicity.

Figure 14:
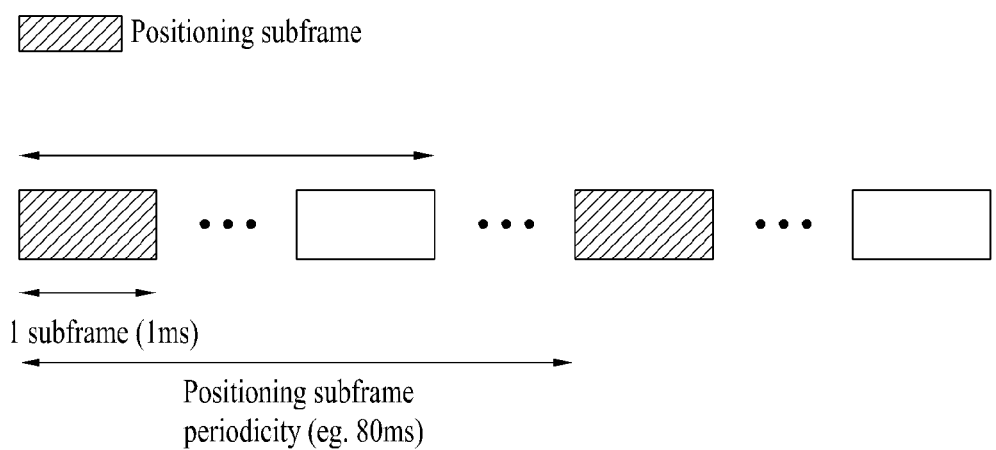
FIG. 14 is a diagram for a relation between a sequence periodicity of a reference signal and a periodicity of a positioning subframe.
Figure 15:
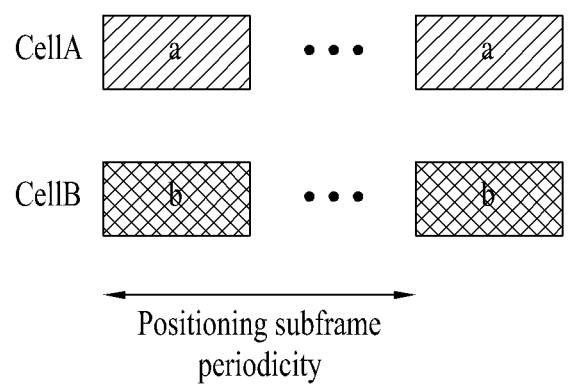
FIG. 15 is a diagram of an example for periodic transmission of a positioning subframe without interference diversity.

FIG. 14 is a diagram for a relation between a sequence periodicity of a reference signal and a periodicity of a positioning subframe. And, FIG. 15 is a diagram of an example for periodic transmission of a positioning subframe without interference diversity.

In FIG. 14, since a periodicity of a reference signal sequence is 10 ms (i.e., a generation periodicity of a common reference signal (CRS) is 10 subframes, i.e., 10 ms.), a reference signal sequence repeated every 80 ms is always the same sequence. In case of observing a positioning subframe in which a cell A collides with a neighbor cell B, a positioning subframe colliding every periodicity of the positioning subframe of the cell A is always a subframe-a and a positioning subframe colliding every periodicity of the positioning subframe of the cell B is always a subframe-b, as shown in FIG. 15.

In this case, the meaning of the same subframe every positioning subframe periodicity indicates that a reference signal sequence transmitted via a subframe each periodicity of a positioning subframe is always the same. Since a positioning subframe colliding every periodicity of the positioning subframe does not change, even if interference between two subframes is infinitely averaged, SIR (signal to interference ratio) is not improved. Therefore, when interference averaging is performed in a positioning subframe, an interference diversity gain may not be obtained. In particular, since a reference signal sequence transmitted in a positioning subframe of a serving cell is a periodically identical sequence and a corresponding reference signal sequence of a neighbor cell is always the same sequence, when a user equipment performs interference averaging on a plurality of positioning subframes, SIR does not change. Therefore, it is requested that a sequence of a reference signal transmitted via a positioning subframe should not be set identical per periodicity.

In the following description, in order to obtain an interference diversity gain from multiple subframe averaging, a method of setting a periodicity of a positioning subframe and a method of transmitting the positioning subframe are explained.

Figure 16:
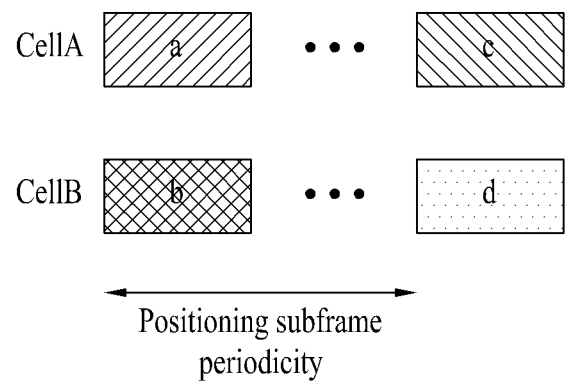
FIG. 16 is a diagram for a case of setting a periodicity of a positioning subframe for an interference diversity gain according to one embodiment of the present invention.

FIG. 16 is a diagram for a case of setting a periodicity of a positioning subframe for an interference diversity gain according to one embodiment of the present invention.

The present invention proposes that a transmission periodicity of a positioning subframe including a positioning RS shall be set by one of the following methods.

First of all, according to a first method, a reference signal generation periodicity and a positioning subframe periodicity are set to establish a disjoint relation in-between. For instance, when a periodicity of a reference signal sequence is 10 ms, a periodicity of a positioning subframe is set to 31 ms that is disjoint with 10. In particular, since a reference signal sequence of two cells colliding with each other at 31 ms and a reference signal sequence of two cells colliding with each other at 31*2 ms have a generation periodicity of a reference signal sequence is 10 ms, the reference signal sequence of two cells colliding with each other at 31 ms is different from the reference signal sequence of two cells colliding with each other at 31*2 ms. Therefore, it is able to obtain an interference diversity gain.

Secondly, according to a second method, a periodicity of a positioning subframe is set smaller than a reference signal generation periodicity. For instance, when a generation periodicity of a reference signal sequence is 10 ms, it is able to set a periodicity of a positioning subframe to 2 ms. Alternatively, when a generation periodicity of a reference signal sequence is 40 ms, it is able to set a periodicity of a positioning subframe to 10 ms. Alternatively, when a generation periodicity of a reference signal sequence is 10 ms, it is able to set a periodicity of a positioning subframe to 1 ms. In this case, if a length of the positioning subframe is equal to a periodicity of the positioning subframe, consecutive positioning subframes can be transmitted.

Thirdly, according to a third method, a periodicity of a positioning subframe is set to obtain at least two interference randomization gains in consideration of multiple subframe averaging. A periodicity of a positioning subframe can be set to a value greater than a generation periodicity of a reference signal sequence and smaller than a twice of the generation periodicity of the reference signal sequence. For instance, when a generation periodicity of a reference signal sequence is 10 ms, it is able to set a periodicity of a positioning subframe to 12 ms. In this case, the positioning subframe is set to be transmitted every 12 ms, 24 ms and 36 ms. Compared to the generation periodicity of the reference signal sequence, sequences respectively corresponding to 2 ms, 4 ms and 6 ms are transmitted. Therefore, it is able to expect a gain of interference randomization. Moreover, when a generation periodicity of a reference signal sequence is 10 ms, it is able to set a periodicity of a positioning subframe to one of 14 ms, 16 ms and the like. In this case, a positioning subframe transmitted by a prescribed periodicity can include a prescribed number of consecutive positioning subframes. For instance, the prescribed number can include 2, 3 or 4. As mentioned in the above description, since reference signal sequences included in positioning subframes colliding with each other between cells at a specific timing point are different from each other, it is able to obtain an effect of interference randomization.

This periodicity of a positioning subframe is predefined or can be notified to a user equipment via higher layer signaling, e.g., RRC signaling.

Meanwhile, according to the present invention, a reference signal transmitted in a positioning subframe is applicable irrespective of a type (e.g., CRS, PRS, etc.) of the reference signal.

Figure 17:
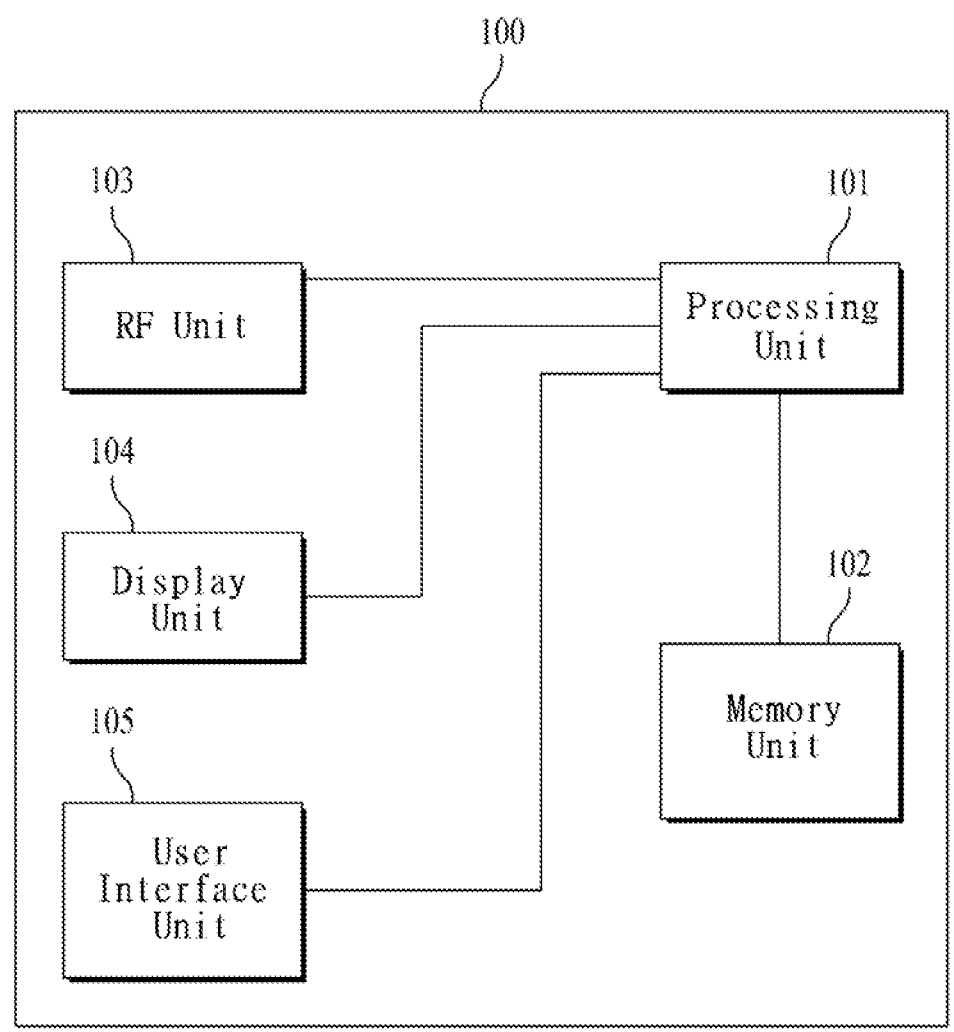
FIG. 17 is a block diagram for a configuration of a device applicable to a base station and a user equipment to perform the above described method.

FIG. 17 is a block diagram for a configuration of a device applicable to a base station and a user equipment to perform the above described method.

Referring to FIG. 17, a device 100 includes a processing unit 101, a memory unit 102, an RF (radio frequency) unit 103, a display unit 104 and a user interface unit 105. A layer of a physical interface protocol is performed by the processing unit 101. The processing unit 101 provides a control plane and a user plane. A function of each layer can be performed by the processing unit 101. Specifically, the processing unit 101 can perform the above mentioned embodiments of the present invention. In particular, the processing unit 101 is able to perform a function of generating a subframe for user equipment positioning or a function of receiving a subframe and then positioning a location of a user equipment. The memory unit 102 is electrically connected to the processing unit 101. And, an operating system, applications and general files are stored in the memory unit 102. If the device 100 is a user equipment, the display unit 104 is able to display various kinds of informations. And, the display unit 104 can be implemented using a well-known LCD (liquid crystal display), an OLED (organic light emitting diode) display and the like. The user interface unit 105 can be configured by being combined with such a well-known user interface as a keypad, a touchscreen and the like. The RF unit 103 is electrically connected to the processing unit 101. The RF unit 103 transmits or receives a radio signal.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

And, according to the present invention, 'user equipment (UE)' can be replaced by such a terminology as a mobile station (MS), a subscriber station (SS), a mobile subscriber station (MSS), a mobile terminal and the like.

Moreover, a user equipment of the present invention can include one of a PDA (Personal Digital Assistant), a cellular phone, a PCS (Personal Communication Service) phone, a GSM (Global System for Mobile) phone, a WCDMA (Wideband CDMA) phone, an MBS (Mobile Broadband System) phone and the like.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various well-known means.

While the present invention has been described and illustrated herein with reference to the preferred embodiments thereof, it will be apparent to those skilled in the art that various modifications and variations can be made therein without departing from the spirit and scope of the invention.

Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

Besides, the present invention is applicable to a user equipment, a base station and other equipments in a wireless mobile communication system.

What is claimed is:

1. A method for positioning a user equipment (UE) in a wireless communication system, the method comprising:
    receiving, by the UE from a plurality of base stations, positioning subframes including reference signals; and
    measuring, by the UE, a timing difference between a time of arrival of a positioning subframe of one of the plurality of base stations and a time of arrival of a positioning subframe of another of the plurality of base stations,
    wherein the positioning subframes are periodically transmitted by each of the plurality of base stations according to a predetermined period,
    wherein the predetermined period of the positioning subframes is set to be smaller than a repetition period of a same reference signal sequence,
    wherein the predetermined period of the positioning subframes is defined in a unit of subframes, and
    wherein a reference signal sequence included in each of the positioning subframes is different from each other.

2. The method of claim 1, wherein the reference signals comprise a common reference signal or a positioning reference signal.

3. The method of claim 1, further comprising receiving information of the predetermined period via Radio Resource Control (RRC).

4. The method of claim 1, wherein each of the positioning subframes includes a reference signal.

5. The method of claim 1, wherein the plurality of base stations include a serving cell.

6. A user equipment (UE) in a wireless communication system, the user equipment comprising:
    a receiver; and
    a processor configured to:
        receive, from a plurality of base stations, positioning subframes including reference signals; and
        measure timing difference between a time of arrival of a positioning subframe of one of the plurality of base stations and a time of arrival of a positioning subframe of another of the plurality of base stations,
    wherein the positioning subframes are periodically transmitted by each of the plurality of base stations according to a predetermined period,
    wherein the predetermined period of the positioning subframes is set to be smaller than a repetition period of a same reference signal sequence,
    wherein the predetermined period of the positioning subframes is defined in a unit of subframes, and
    wherein a reference signal sequence included in each of the positioning subframes is different from each other.

7. The user equipment of claim 6, wherein the reference signals comprise a common reference signal or a positioning reference signal.

8. The user equipment of claim 6, wherein the receiver receives information of the predetermined period via Radio Resource Control (RRC).

9. The user equipment of claim 6, wherein each of the positioning subframes includes a reference signal.

10. The user equipment of claim 6, wherein the plurality of base stations include a serving cell.

* * * * *